United States Patent [19]

Kahrs et al.

[11] Patent Number: 5,147,007
[45] Date of Patent: Sep. 15, 1992

[54] HYDRAULICALLY ASSISTED STEERING SYSTEM FOR AUTOMOTIVE VEHICLES

[75] Inventors: Manfred Kahrs, Wiesbaden; Lothar Kunze, Hofheim-Langehain; Joachim Baier, Hanau; Gerhard Kunz, Linden; Bernhard Moeller, Frankfurt am Main; Wilhelm Beer, Ruesselsheim; Hans-G. Krines, Usingen; Gerhardt Schudt, Hanau, all of Fed. Rep. of Germany

[73] Assignee: Alfred Teves GmbH, Frankfurt Am Main, Fed. Rep. of Germany

[21] Appl. No.: 499,383

[22] PCT Filed: Sep. 14, 1989

[86] PCT No.: PCT/EP89/01069
§ 371 Date: Jun. 1, 1990
§ 102(e) Date: Jun. 1, 1990

[87] PCT Pub. No.: WO90/03908
PCT Pub. Date: Apr. 19, 1990

[30] Foreign Application Priority Data

Oct. 4, 1988 [DE] Fed. Rep. of Germany ....... 3833637
Dec. 24, 1988 [DE] Fed. Rep. of Germany ....... 3843893
Aug. 28, 1989 [DE] Fed. Rep. of Germany ....... 3928376

[51] Int. Cl.$^5$ .............................................. B62D 5/06
[52] U.S. Cl. .................................... 180/132; 180/148; 280/91
[58] Field of Search ................ 180/148, 132; 280/661, 280/91

[56] References Cited

U.S. PATENT DOCUMENTS

| | | | |
|---|---|---|---|
| 4,634,135 | 1/1987 | Nakata et al. | 180/148 |
| 4,646,868 | 3/1987 | Rosell | 180/148 |
| 4,694,925 | 9/1987 | Roberts | 180/148 |
| 4,823,898 | 4/1989 | Ogura et al. | 180/148 |
| 4,856,608 | 8/1989 | Adams | 180/148 |
| 4,981,189 | 1/1991 | Wilder | 180/148 |

Primary Examiner—Mitchell J. Hill
Attorney, Agent, or Firm—Robert P. Seitter; J. Gordon Lewis

[57] ABSTRACT

A hydraulic power steering system for automotive vehicles wherein the hydraulic power assistance takes place only above a predetermined steering power. A power cylinder (6) is coupled to a mechanical steering assembly, a pump (19, 36), and a control valve (12). In order to achieve safety in operation and a simple arrangement of the power steering system, a slide of a component (2) of the mechanical steering assembly is slidable with respect to the vehicle body. The slide is effected by the steering power overcoming a prestressing power, serves for the mechanical actuation of the control valve (12).

28 Claims, 14 Drawing Sheets

HYDRAULICALLY ASSISTED STEERING SYSTEM FOR AUTOMOTIVE VEHICLES

BACKGROUND OF THE INVENTION

The present present invention relates to a hydraulic power steering system for automotive vehicles including a power cylinder coupled to a mechanical steering assembly, a pump and a control valve.

A hydraulic power steering system of this type is known from published German patent application No. 28 39 121. This known power steering system is comprised of a measured variable transmitter depending on the angle of rotation. The transmitter serves as a sensor for the hand power applied to the steering wheel. The output signal is transmitted to an electronic control module which controls the solenoid valves which are located between the pump and the power cylinder. In addition to their sophisticated and cost-intensive arrangements, these known power steering systems have the disadvantage that the steering assembly may become locked in the event of a defect of the electronic control module. Although this risk could be avoided by the redundant design of the electronic control system, the resulting increased sophistication would nevertheless result in a further disadvantage.

It is, therefore, an object of the present invention to provide a hydraulic power steering system for automotive vehicles of the type described above which is distinguished by a simple arrangement and which ensures safety in operation. In particular, the hydraulic power assistance dependent on demand is controlled without sophisticated electronic modules.

SUMMARY OF THE INVENTION

In a preferred embodiment of the invention it is envisaged that one of two valve elements slidable relative to each other is secured to the slidable component, while the other valve element is pivoted on the vehicle body. In this way, the control valve is actuated directly starting from a steering power determined by the prestressing power. The power flux is transmitted through a very restricted number of components.

According to a preferred embodiment of the present invention, the steering gear of the mechanical steering assembly is elastically slidably supported at the vehicle. The hydraulic unit, with at least one of two valve elements being slidable relative to each other, is rigidly secured to the steering gear. The other valve element is coupled to the vehicle body. This embodiment allows for the arrangement of an element generating the prestressing power both between the vehicle body and one valve element and between the two valve elements A highly effective silencing is attained by an elastic connection between the vehicle body and the steering gear, the hydraulic unit being rigidly coupled to the steering gear.

In order to obtain an integrated hydraulic unit as compact as possible and comprising any components required for control, it is advantageous when the steering gear is supported at the vehicle body so as to be slidable in the transverse axis of the vehicle. This is particularly advantageous when the housing of the control valve is rigidly coupled to the steering gear and when the control element is coupled to the vehicle and is slidable within the housing of the control valve and is elastically prestressed in both sliding directions against the housing of the control valve or against a component being rigidly coupled to the latter. By this embodiment, a completely preassembled, oil-filled and functionally tested hydraulic unit is provided which is ready for operation and does not require measures other than to be mounted a the vehicle with simple assembly operations and to be connected thereto.

One embodiment of the present invention which provides for the steering gear to be rigidly coupled to the vehicle body entails that one section of the steering axle is slidably supported and that the slide actuates the control valves in response to a force component which results from the steering power. Steering gears particularly suited to generate components of force of reaction of this kind are either designed as helical rack-and-pinion gears or as ball-type planetary gearings. In both designs, a component of the force of reaction being proportional to the steering power as to size and direction is generated in the steering axle which is utilized to influence the control valve preferably integrated in the steering axle or in the steering axle housing in this case. Depending on the specific type of application, different designs of the spring elements are possible for the purpose of generating the prestressing force which is brought to bear on the slidable component.

According to a further embodiment which is particularly advantageous in regard to road behavior, the prestressing is effected by means of a captivated spring element. In this manner, a prestressing also exists in the neutral position. This means that the control valve is actuated only starting from a minimum steering power, as a result of which provision a start of the hydraulic power assistance is, for example, avoided in the event of steering corrections which result from the impact of lateral wind at elevated speeds, unbalances of a wheel or wheels or the like. Without this minimum steering power threshold, an unstable oscillation of the steering action would be possible by an alternating switching-in of the hydraulic power assistance and countersteering on the part of the driver. Since the energy supply of the hydraulic unit takes place exclusively in the event of a demand for power assistance, it is provided that an electric switch switching the pump is actuatable by the control element or spring element. In an advantageous embodiment of the present invention, the control valve is designed as a 3/3-way valve in the shape of a longitudinal slide valve. Alternatively, a valve designed as a double-seated valve is suitable for use in the hydraulic power steering system, because in that case a simple pivoting of the control element on the vehicle body is possible.

A particularly simple configuration of the inventive power steering system is attained if and when a reversible pump is provided whose sense of rotation depends on the sense of steering. In this configuration, the control element of the control valve actuates a switch having three switching positions. An embodiment of the invention in which the slidable component of the mechanical steering assembly is slidable only at a limited extent is particularly advantageous since only a determined part of the steering power takes support through the control valve in this case. Another embodiment of the present invention is distinguished by the control valve being elastically centered, the centering elastic arrangement being at least partly located in the power flux of the steering power in this context. Owing to this provision, the centering springs of the control valve may, for example, serve for the mechanical steering by adequately dimensioning the prestressing of the slidable component, the prestressing power again forming the threshold value at which the hydraulic boosting will be activated.

A particularly low-cost and compact design is achieved for the power steering system in accordance with the present invention in that the elastic arrangement is comprised of at least one spring taking support at two support plates. The support plates are prestressed against two stops of the housing of the control valve located at a distance from each other and stop surfaces of equal distance are provided at the control element of the control valve by means of which force is applied on the associated support plate in a direction contrasting that of the prestressing power.

In order to ensure the hydraulic fluid supply also with a pump having a low power consumption in the presence of elevated steering speeds and high hydraulic fluid demand, it is an advantage if an accumulator is interposed between the pump and the control valve. In order to avoid an undesired discharge of the accumulator due to leakages at the control valve, a pilot valve is provided in a preferred embodiment of the present invention between the accumulator and the control valve.

When the hydraulic power steering system is run with brake fluid as a pressure fluid, then an energy supply can be provided by the pump of a hydraulic brake unit without segregation of the fluids.

In another particularly favorable embodiment of the present invention, the mechanical steering assembly is arranged as a rack-and-pinion steering system with a driving pinion coupled to the steering axle and with a rack, wherein the torque transmission from the steering axle onto the driving pinion is effected by way of at least one pin which engages into radially extending recesses of both the driving pinion and the steering axle. One of these radial recesses is designed as a coulisse-type guide extending transversely relative to the radial plane, and the steering axle supported on the driving pinion in an axially slidable and biassed manner and is connected with the control valve. As a result a power steering system is accomplished which is characterized by a compact and straight-forward design, yet requires only a minimum of modifications to the component parts of the mechanical steering gear, while most gear parts of a steering gear provided for use on the purely mechanical steering assembly are maintained in the power steering system.

This affords the possibility of obtaining an add-on hydraulic power steering system which involves very little modification to the existing mechanical steering assembly. This solution is especially suitable for rack-and-pinion steering systems in which the driving pinion is not helically geared.

In a power steering system comprising a helically geared driving pinion, a simple solution which involves only very few modifications of the steering gear can be obtained wherein the driving pinion is supported in the housing of the steering gear axially slidably by means of at least one roller bearing, wherein the external ring of the roller bearing is axially slidably supported in the housing and is acted upon by elastic means on either frontal ends, and wherein the internal bearing ring is axially fixed on the driving pinion, with the driving pinion being coupled to the control valve.

If it is essentially impossible to modify the support of the driving pinion in the area of the housing, an embodiment of this invention can be used wherein the internal ring of the roller bearing is supported axially slidably on the driving pinion, which is coupled to the control valve, and is acted upon on either frontal end by elastic means, and wherein the external ring of the bearing is axially fixed in the housing.

In hydraulic power steering systems of this type, it is a particular advantage if the elastic application causes a preloading force to develop in the zero position of the steering system, that is, it essentially forms a power threshold. This can be achieved in particular by the use of captivated spring elements. Therefore, in a preferred embodiment of the present invention, the application of the frontal ends of the bearings of the driving shaft is performed by way of spacers which are movable to abut on a stop, with the distance of the stops corresponding to the width of the slidable bearing ring. As a result of these arrangements, a particularly simple centering of the control valve is realized.

In another embodiment of the present invention the steering axle end projecting from the steering gear housing does not perform an axial movement. To this end, it is arranged that the driving pinion coupled to the control valve is helically geared, that at least one portion of the steering axle is rotatably but axially fixedly supported in the steering gear, and in that the driving pinion is axially slidably supported in the portion of the steering axle and biassed in both axial directions of the motion.

To prevent friction affects on the response behavior of the hydraulic auxiliary power, in the area of the point of support of the driving pinion in the steering axle portion, both in the journal pin of the driving pinion and in the associated bearing area of the portion of the steering axle, at least one axially extending groove advantageously is provided, into which at least one spherical carrier element respectively is inserted A particularly favorable embodiment of the present invention is obtained if the control valve is connected coaxially with the driving pinion and serves to support the driving pinion in the housing of the steering gear.

BRIEF DESCRIPTION OF THE DRAWINGS

The functioning and further advantageous features of the present invention will now be described in the following detailed description made with reference to the accompanying drawing wherein.

DETAILED DESCRIPTION

Figure 1:
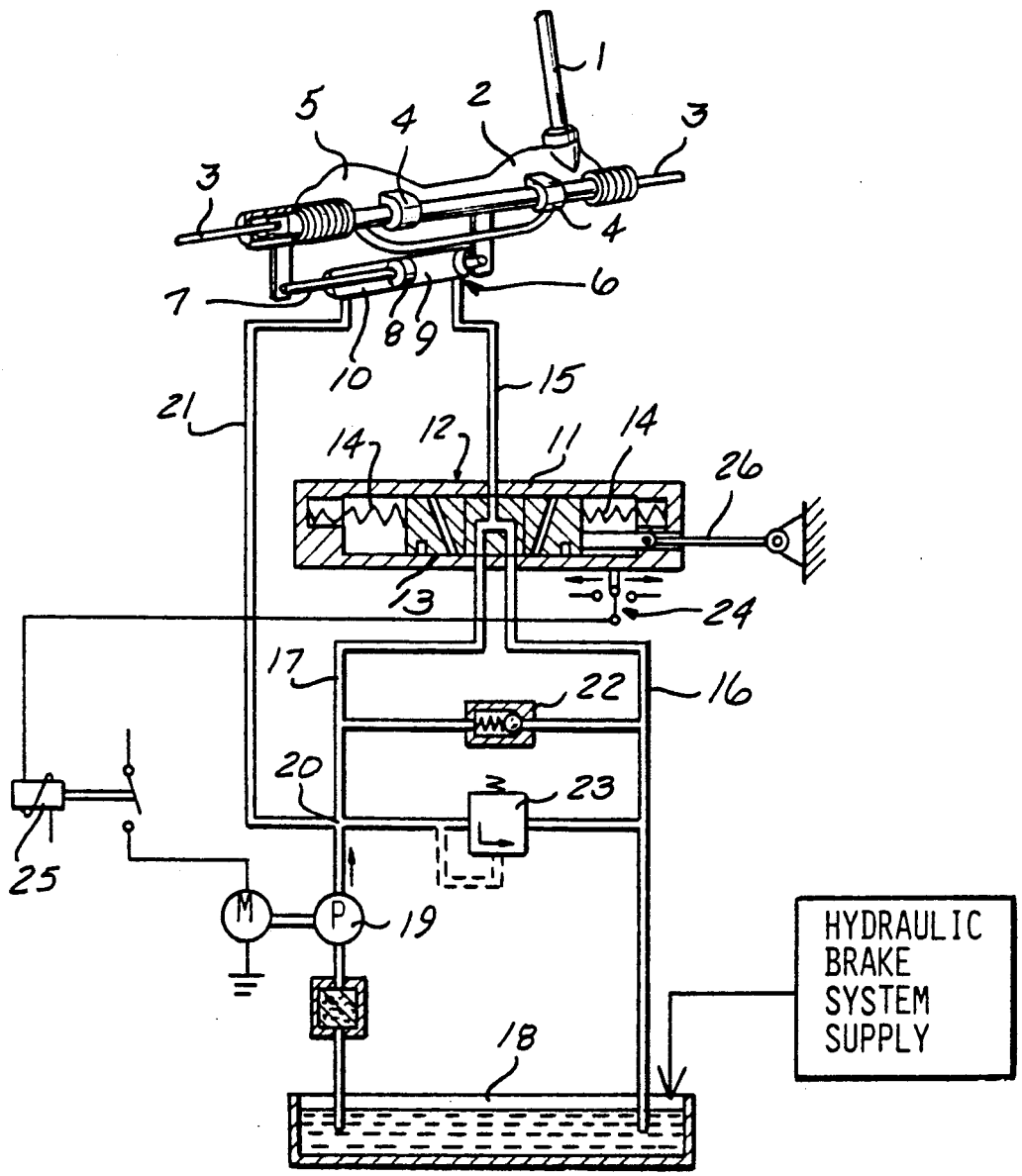
FIG. 1 shows a first embodiment of the invention.

The hydraulic power steering system according to FIG. 1 is a mechanical steering assembly comprising a steering axle 1, a steering gear 2, and a steering tie rod 3. The steering tie rods are pivoted on steering arms of the wheel suspension (not shown). The steering gear is bolted or screwed by means of two clamps 4 and high-elasticity elements to the vehicle body 5. The high-elasticity suspension of the steering gear 2 permits a certain slidability in the transverse direction of the vehicle.

The power cylinder 6 is rigidly bolted or screwed to the housing of the steering gear 2, while the piston rod 7 is rigidly coupled to the steering tie rod 3. At the other end of the piston rod 7, there is a power piston 8 which divides the power chambers 9 and 10 from each other within the power cylinder 6. The housing 11 of the control valve 12 is rigidly coupled to the power cylinder 6, respectively to the steering gear. Within the housing 11, the slidably arranged control slide valve 13 is prestressed against the housing in either direction of slide by means of two springs 14 having equal spring force, and is centered in the rest position.

The control valve 12 is arranged in the shape of a 3/3-way valve, one connection being tied through the link 15 to the power chamber 9 of the power cylinder 6, while the other two connections are tied through the links 16 and 17 to the tank 18, respectively to the delivery connection of the pump 19. The power cylinder 6 is configured in the shape of a differential cylinder, the power chamber 9 being associated with the larger pressurizing surface at the power piston, whereas the cross-sectional area of the piston being associated with the power chamber 10 is half the size of the described pressurizing surface. From the intersection 20 of the link 17, a hydraulic fluid line 21 leads to the power chamber 10 of the power cylinder 6. Between the links 16 and 17, two links are provided with an intake valve 22 being located in one of them and a pressure relief valve 23 in the other one. A filter element is arranged in the link between the tank 18 and the pump 19 driven by an electric motor. The electric drive of the pump 19 is actuated by the electric switch 24 through a relay 25. The switch is actuated by the slide of the control slide valve 13 out of the position of rest. The control slide valve 13 is pivoted on a point rigid with the vehicle by means of a reaction rod 26.

As long as the steering system is not actuated or is actuated with a very low hand power, the hydraulic power steering system is in the position of rest shown in the drawing. In this position, the pump 19 is switched off by the electric switch 24. The power chambers 9 and 10 are interconnected and connected to the tank hydraulically. A more elevated steering power is required when the steering assembly is operated, for example, while the vehicle is at rest or at very low speeds. In that case, the steering gear 2 will slide according to the steering direction within its elastic suspension at the vehicle body in a direction which is transverse to the vehicle steering axis. Since the whole hydraulic unit, in particular the housing 11 of the control valve 12, is rigidly coupled to the steering gear 2, while the control slide valve 13 is pivoted in a point being rigid with the vehicle body, a slide of the housing 11 and of the control slide valve 13 relative to each other will occur starting from a steering power which exceeds the prestressing of the associated spring 14. By this relative slide the electric motor driving the pump will be switched in, and, moreover, the control valve 12 will be brought into a switching position depending on the steering direction, in which position the power piston 8 is pressurizable by the pump pressure according to its active cross-sectional areas.

As long as the pump 19 is switched in, the power chamber 10 will remain pressurized, so that in the event of a switching position of the control valve 12 in which the power chamber 9 is in connection with the tank 18, a direction of motion of the power piston 8 will result in which the piston rod 7 is slid into the power cylinder 6. When, on the other hand, both the power chamber 10 and the power chamber 9 undergo the pump pressure, then the piston rod 7 will be slid out of the power cylinder 6. If during or after a steering motion the steering power exerted at the steering tie rod decreases to a value which is sufficient to overcome the prestressing of the associated spring 14, the control valve 12 will be restored into its position of rest, whereby the pump is switched off and the power chambers 9 and 10 are interconnected to each other and connected to the tank 18 again.

In the event of a steering operation without power assistance, the hydraulic fluid will be transferred between the two power chambers without any pressure, the differential fluid volume resulting from the volume of the piston rod being aspirated from the tank or discharged into the tank depending on the steering direction. This applies both in case the manually exerted steering power is very low and in case of failure of the pump or of the electric energy supply of the driving motor.

Figure 2:
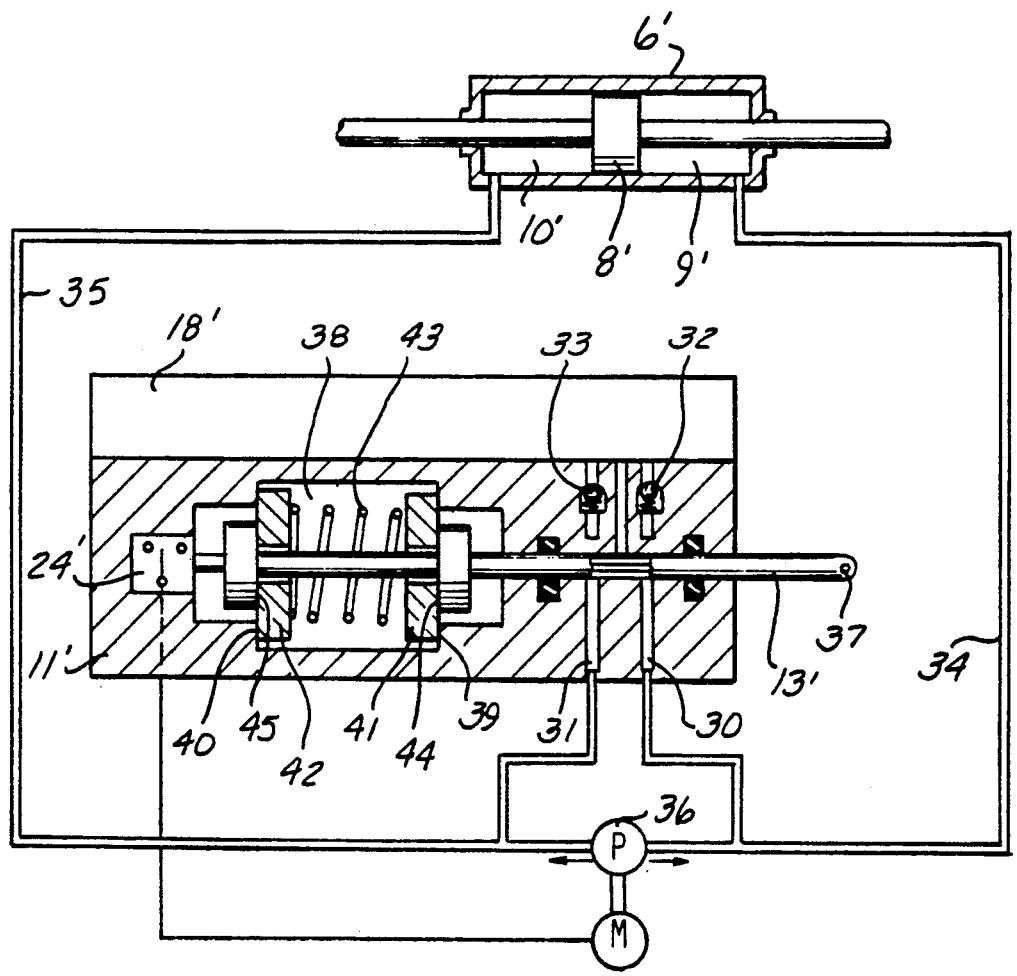
FIG. 2 shows a second embodiment of the invention in the rest position or in the event of the steering mechanism being operated without power assistance.
Figure 3:
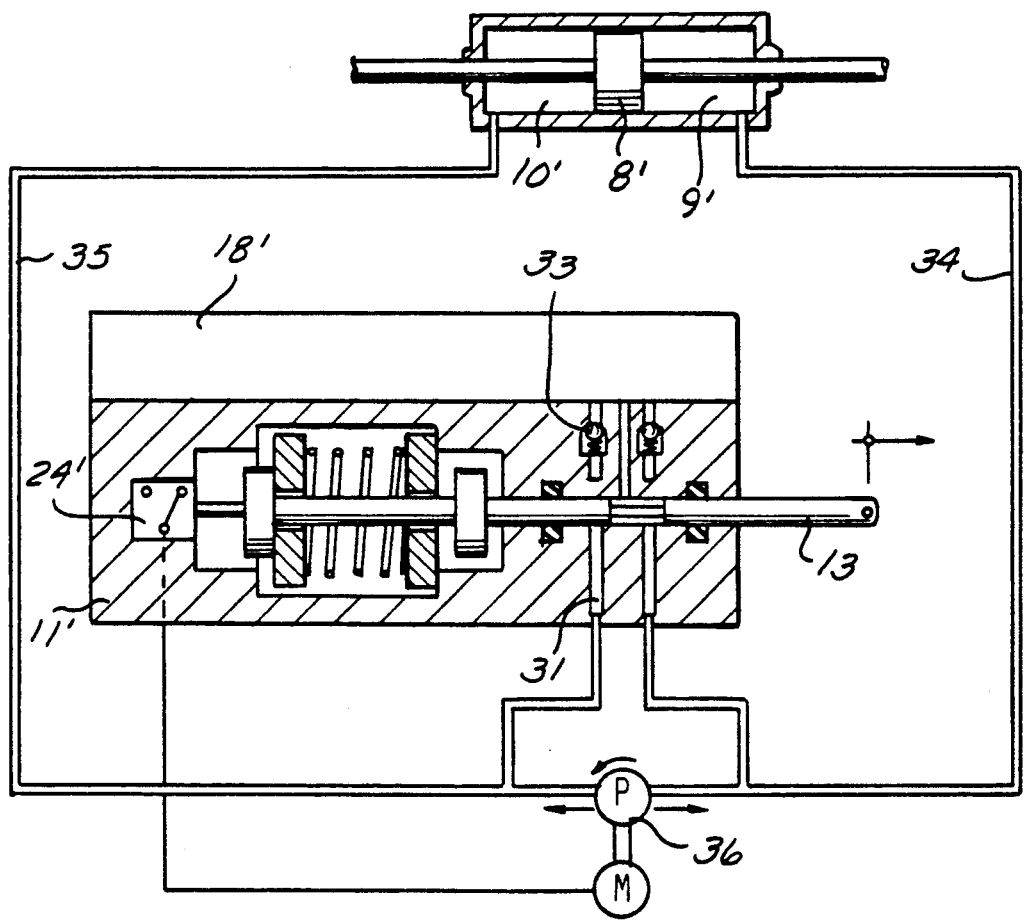
FIG. 3 shows the second embodiment of the invention in the switching position for an operation of the steering system with power assistance.

The embodiment according to FIGS. 2 and 3 shows an arrangement of the power cylinder 6 in the shape of a synchronous cylinder. The mechanical part of the steering system is not illustrated in these two Figures. Like reference numerals are assigned to like elements in all three Figures. The part of the steering system not shown in the drawing corresponds to the arrangement of FIG. 1. In FIG. 2, the rest position is illustrated which comes about when the steering system is not actuated or when the steering system is actuated with a very low steering power. The control slide valve 13 which is sealedly guided within the housing 11 in a slidable way is furnished with a control groove by which the connection of the ducts 30 and 31 to the tank 18 is controllable. By-passing the control slide valve 13, the ducts 30 and 31 are connected to the tank 18 through the non-return valves 32 and 33. In this configuration, non-return valves 32 and 33 are arranged such that they block the flow direction from the associated duct to the tank 18. The duct 30 is connected to the hydraulic fluid link 34 which is provided between the reversible pump 36 and the power chamber 9. The duct 31 is connected to the hydraulic fluid link 35 between the power chamber 10 and the reversible pump 36. The tank 18 is integrated in the housing 11.

The control slide valve 13 presenting a plurality of steps is guided by the centering chamber 38 arranged in the housing 11. At the one end of centering chamber 38 an electric switch 24 is located which is connected to one end of control slide valve 13 and which switches the electric motor driving the pump. At the other end of the control slide valve 13 there is the pivotal point 37 which is coupled to the vehicle body.

The stepped centering chamber 38 presents two stops 39 and 40 at each of which one of the two associated supporting plates 41 and 42 takes support which are subject to the pressure exerted by the compression spring 43 being arranged between the two supporting plates. On either side of the supporting plates 41, 42, two steps are provided at the control slide valve is guided by the supporting plates whose stop surfaces 44, 45 facing said supporting plates are disposed at the same distance from each other as the stops 39 and 40. As long as the supporting plates 41 and 42 are abutted against the associated stops 39, 40 the control valve, respectively, the control groove will be in the position of rest in which the pump is switched off. Without power assistance the hydraulic fluid will be displaced between the two power chambers without pressure during this time.

The mode of functioning of the second inventive embodiment of the present invention corresponds to that of the embodiment described with reference to FIG. 1. As soon as the steering power applied exceeds a determined value, the control slide valve will be slid in one or the other direction depending on the steering direction, against the prestressing force of the spring 43. One switching position is illustrated in FIG. 3. In this switching mode, the power piston 8 according to the illustration in FIG. 3 is slid to the right. In accordance with the steering power applied, the housing 11 coupled to the elastically suspended steering gear 2 will slide to the left, while the control slide valve will maintain its position due to its being rigidly pivoted on the vehicle. As a consequence of the relative motion between the control slide valve 13 and the housing 11, the electric switch 24 will be actuated, whereby the reversible pump 36 will be driven in a sense of rotation by which it conveys into the hydraulic fluid link 35 and, thus, into the power chamber 10. The duct 31 is separated from the tank 18 in this switching position, while the duct 30 and, consequently, the power chamber 9 are connected to the tank 18. The volume of hydraulic fluid displaced from the power chamber 9 is fed to the tank 18 over the forementioned connection. If the pump 36 should meet with a failure in an operating condition of this kind, then the hydraulic fluid would have to be displaced out of the power chamber 9 without power assistance, that is, only by hand power into the tank 18, while the power chamber 10 may aspirate hydraulic fluid from the tank 18 through the non-return valve 33.

When the steering direction is inverted, the housing 11 is slid in the other direction, as a result of which the reversible pump 36 is switched into the other sense of rotation so that it delivers into the power chamber 9. Also the switching of the ducts 30, 31 will so be inverted. Alternatively, it will of course be possible to couple the control slide valve 13 to the slidable steering gear 2 and to fix the housing 11 to the vehicle.

Figure 4:
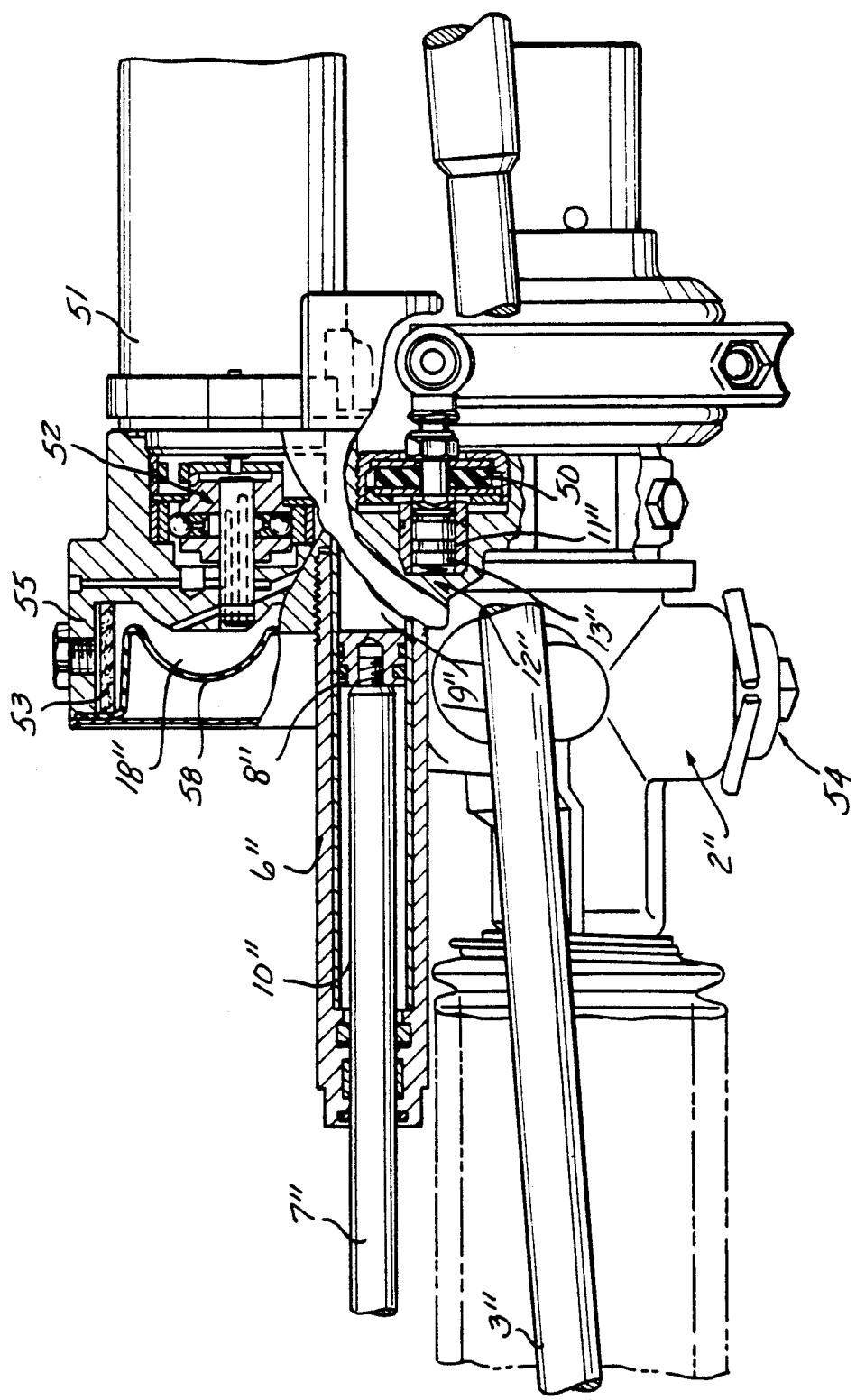
FIG. 4 is a representation with several sections of the integrated hydraulic unit.

FIG. 4 shows a particularly compact arrangement of the invention arranged as an integrated unit around the steering gear 2. Steering gear 2 is designed as a rack-and-pinion gear, the driving pinion coupled to the steering axle being arranged within the housing of the steering gear and engaging the rack. By means of an adjusting apparatus 54, a thrust member acting on the rack allows adjustment in such a manner as to create freedom for play between the rack and the driving pinion. On the left side when viewed in the drawing, the rack projects out of the housing of the steering gear 2. The piston rod 7 and the two steering tie rods 3 are flanged to that projecting end (not shown in the drawing). The steering tie rod illustrated in FIG. 4 is coupled to the steering arm of the left front wheel. The steering gear 2 is coupled to the vehicle body such as to be elastically slidable in transverse direction. On the contrary, the hydraulic unit is rigidly coupled to the housing of the steering gear 2.

Figure 5:
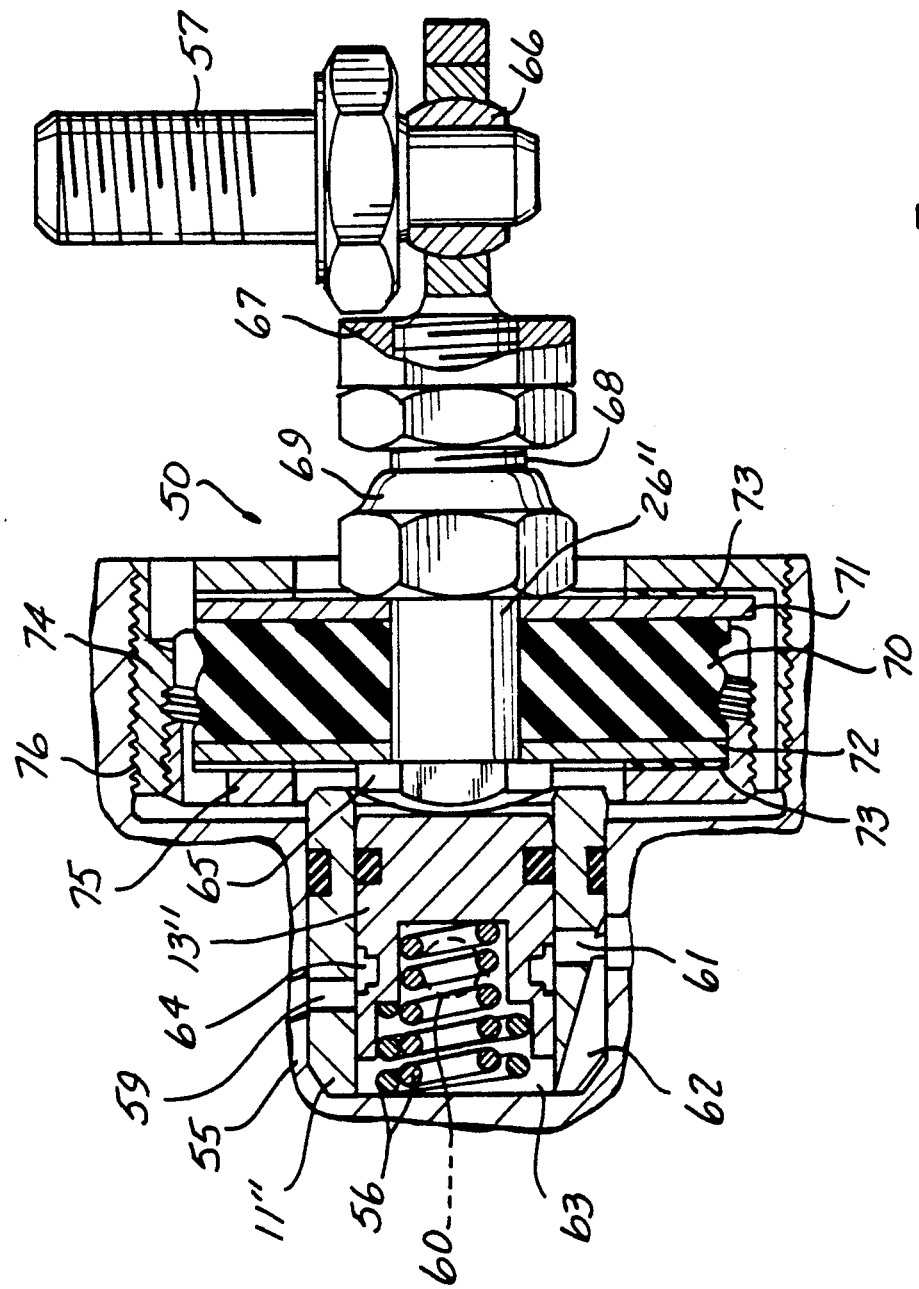
FIG. 5 shows a cross section through an embodiment of the inventive spring element in the shape of a captivated spring and through the control valve.

The hydraulic unit is furnished with a radial piston pump 52 driven by an electric motor 51, which is incorporated in the intermediate flange 55 in the shape of a pre-assembled pump insert and which delivers hydraulic fluid in prior-art manner through a stationary control spigot from the tank 18 into a connecting bore (not shown in the drawing) which is provided in the intermediate flange 55 and is coupled to the control valve 12 and to the power chamber 10. The housing 11 of the control valve 12 is fixed in the intermediate flange 55. As is illustrated more clearly by FIG. 5, the control slide valve 13 is subject to the action of helical springs 56 from one front side, which keep it in abutment against the reaction rod 26. The reaction rod 26 is fixed to the vehicle body by means of the screw 57.

In principle, the method of operation of the embodiment as per FIG. 4 corresponds to that which is illustrated diagrammatically in FIG. 1. Accordingly, ducts not shown in the drawing lead from the control valve 12 to one each of the power chambers 9, 10. The tank 18 in which a strainer 53 is provided is limited by a compensating cup 58 which constantly ensures a compensation of volume, as a result of which it is ensured that the pump does not aspirate any air. Compensating cup 58 is required since this design represents a closed hydraulic system. A further particular feature of the embodiment according to FIG. 4 is provided by the way in which the prestressing is brought about of the reaction rod 26, respectively of the control slide valve 13. This will be explained in more detail with reference to FIG. 5 which shows an upscaled detail of FIG. 4.

The housing 11 of the control valve 12 which is sealedly secured within the intermediate flange 55 presents three control bores 59, 60, 61 being staggered in axial and in radial direction. According to the connecting diagram shown in FIG. 1, the control bore 59 is connected to the delivery side of the radial piston pump and to the power chamber 10 by associated ducts in the intermediate flange. The control bore 60 leads to the power chamber 9, while the control bore 61 is connected to the tank 18. The chamber 63 in which the helical springs 56 are arranged also is connected to the tank through the groove 62 in the housing 11. The control slide valve 13 is furnished with a stepped annular groove 64 by which the control edges are formed. A smooth switching characteristic is achieved due to the radially outwardly extending step of the annular groove 64.

Figure 6:
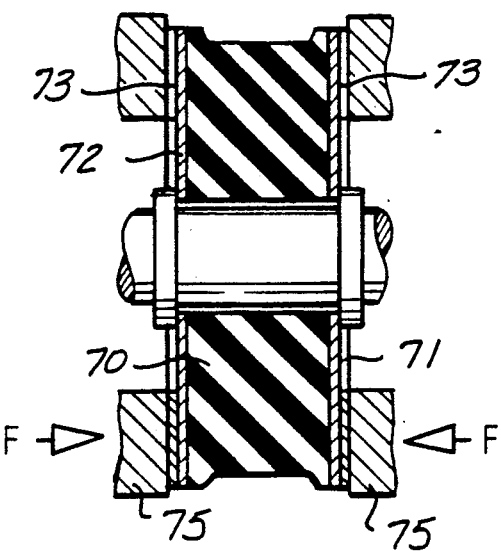
FIG. 6 to FIG. 8 show sections through a spring element according to the present invention.
Figure 7:
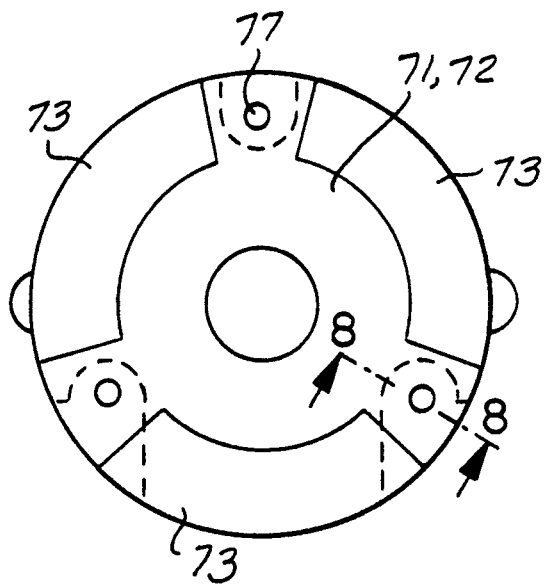
Figure 8:
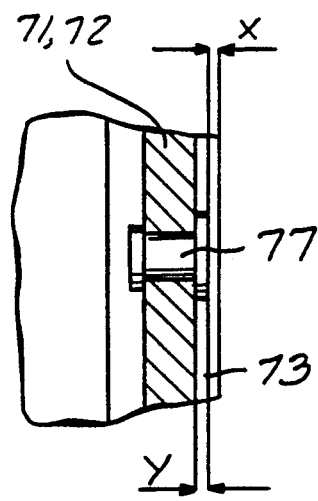

The front side of the control slide valve 13 located opposite the chamber 63 is in abutment against the outwardly bulged head portion 65 of the reaction rod 26. The reaction rod 26 is rigidly coupled to the vehicle body by means of the screw 57. Due to the screw 57 being secured to the reaction rod 26 through a ball-shaped bushing 66, the angle between the screw 57 and the reaction rod 26 is variable, as a result of which canting or clamping is avoided. The bushing 66 is retained in a coupling element 67 which is screwed onto the threaded section 68 of the reaction rod 26. This provision permits adapting the length to the mounting conditions. Upon the adjustment, the coupling element 67 is secured by a counter nut. The adjusting nut 69 also is screwed onto the threaded section 68. By means of adjusting nut 69, the prestressing of the damping element 50 is adjusted which is located between the former and the head portion 65. The spring element 50 is composed of the elastomeric block 70 of the plates 72, 72, of the elastic sections 73, and of the two housing parts 74, 75. The arrangement of the spring element 50 is illustrated in detail in FIGS. 6 to 8 for better understanding.

The prestressing of the elastomeric block 70 is obtained by pressing together the plates 71, 72 in axial direction which are arranged one each at a front side of the ring-shaped elastomeric block, by means of the adjusting nut 69. At the front sides of the plates 71, 72 disposed opposite the damping block 70, there are provided elastic sections 73 which are each in abutment against one of the two housing parts 74, 75 and which surround the damping element. At its radial generated surface, the housing part 75 is provided with an external thread with which it is screwable into the internal thread of the housing part 74. An abutment free of play or, alternatively, a prestressing of the elastic sections between the two housing parts 74, 75 is adjusted by this screwed coupling. The housing part 74 is screwable into the intermediate flange 55 by means of the external thread 76, in which way the axial position of the reaction rod 26 and of the control slide valve 13 allows to be adjusted.

Switching contacts 77 are arranged in the spring element 50 for switching of the radial piston pump 52, the switching contacts 77 being fixed to the plates 71, 72. The switching contacts 77 project axially beyond the plate 71, respectively 72 by the measure Y in the direction of the associated housing half. After the elastic sections 73 have been compressed by the measure X, the contact will be closed by the switching contact 77 coming to be abutted against the associated housing half. The elastic sections 73 also serve for silencing by avoiding sound conducted through solids and for damping of mechanical shocks in the steering assembly.

Figure 12:
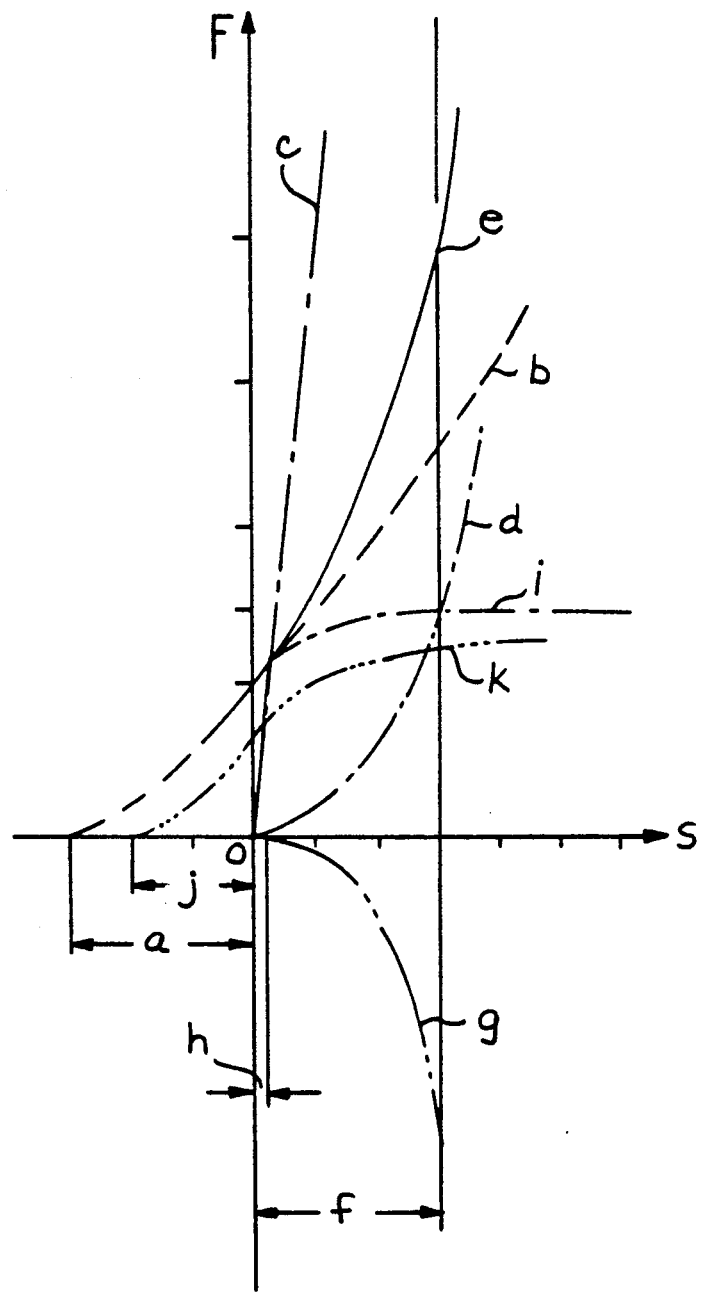
FIG. 12 shows a diagram of forces useful in explaining features of the present invention.

For better understanding of the functioning of the spring element 50 within the framework of the inventive embodiments, reference is made to FIG. 12 which shows a force, respectively a spring diagram. In that diagram, the slide of the steering gear in transverse direction is plotted on the abscissa, whereas the ordinate indicates the forces to be applied in each case. The curve b indicates the stiffness of the prestressed elastomeric block 70 whose prestressing is achieved by the compression by the measure a. The straight line c shows the stiffness of the elastic sections 73. The curve d shows the stiffness of the bearing with which the steering gear 2 is secured to the vehicle body 5 in such a way as to be slidable in transverse direction. The curve e results from the sum of the curves b and d and is, thus, the total transverse stiffness which must be overcome in order to slide the steering gear up to the maximum sliding distance f. The curve e describes the display of power of the power cylinder which assists the physical work of the driver. On the slide of the steering gear, the pump is switched by the amount h. Subtracting the display of power g of the power cylinder from the total stiffness in transverse direction e obtains the curve i which indicates the power to be applied by the driver. Upon reaching the maximum sliding distance f of the steering gear, the muscle power which needs to be applied by the driver will remain constant. If the power which needs to be applied by the driver is to be reduced, then this can, for instance, be achieved by a reduced prestressing of the elastomeric block 70. In deed, if this block 70 is predeformed only by the measure j, then the curve k will result as the characteristic curve of the muscle power to be applied by the driver.

Figure 9:
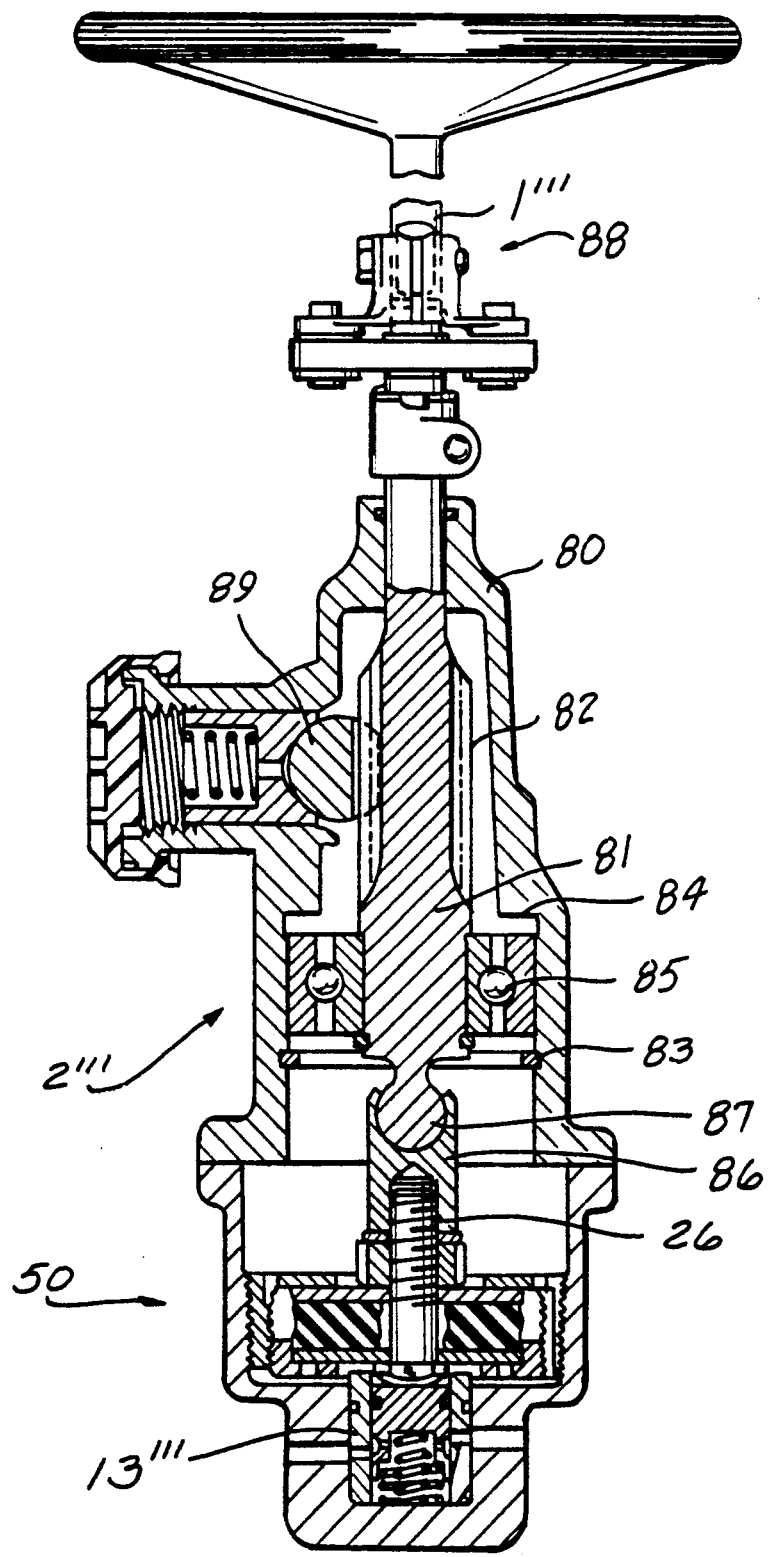
FIG. 9 shows an embodiment of the invention with a control valve coupled to the steering axle through the spring element.

An embodiment of the invention according to FIG. 9 can advantageously be utilized first of all if a transversely elastic fixation of the steering gear to the vehicle body is not possible In that case, the relative motion between the steering axle and its housing 80 is used as the control variable which actuates the control slide valve 13. According to FIG. 9, the housing 80 of the steering gear 2 is rigidly coupled to the vehicle body for this purpose. The steering gear 2 is designed as a rack-and-pinion steering mechanism with spiral gearing. The section 81 of the steering axle 1 which bears the driving pinion 82 is arranged axially slidably within the housing 80. The axial slidability is realized in that the outer ring of a ball bearing 85 axially fixed on the steering axle is guided on a sliding surface between the stops 83, 84. The section 81 of the steering axle 1 is pivoted on a connecting member 86. For this purpose, the connecting member is caulked like a socket to the ball-shaped end 87 of the section 81. Into the connecting member 86 the reaction rod 26 is screwed which is abutted, similar to the illustration of FIG. 5, against the control slide valve 13 and is elastically coupled to the housing 80 through the captivated spring element 50. In order to balance the axial stroke of the section 81 of the steering axle, section 81 is coupled to the steering wheel through a compensating apparatus 88.

When the steering wheel is being rotated by the driver in any sense, this rotating motion of the driving pinion 82 is translated into an axial motion of the rack 89. Due to the spiral gearing and depending on the sense of rotation of the steering wheel, an axial force component of the section 81 will become effective which results in an axial slide of the section 81, until the outer ring of the ball bearing 85 comes to be abutted either against the stop 84 or against the stop 83. In this manner, the control slide valve 13 is acted upon depending on the steering direction. The foregoing descriptions of the function, in particular with reference to FIG. 12, apply to this embodiment as well. For clarity, the hydraulic unit is not shown in FIG. 9 except save for the control valve 12.

Figure 10:
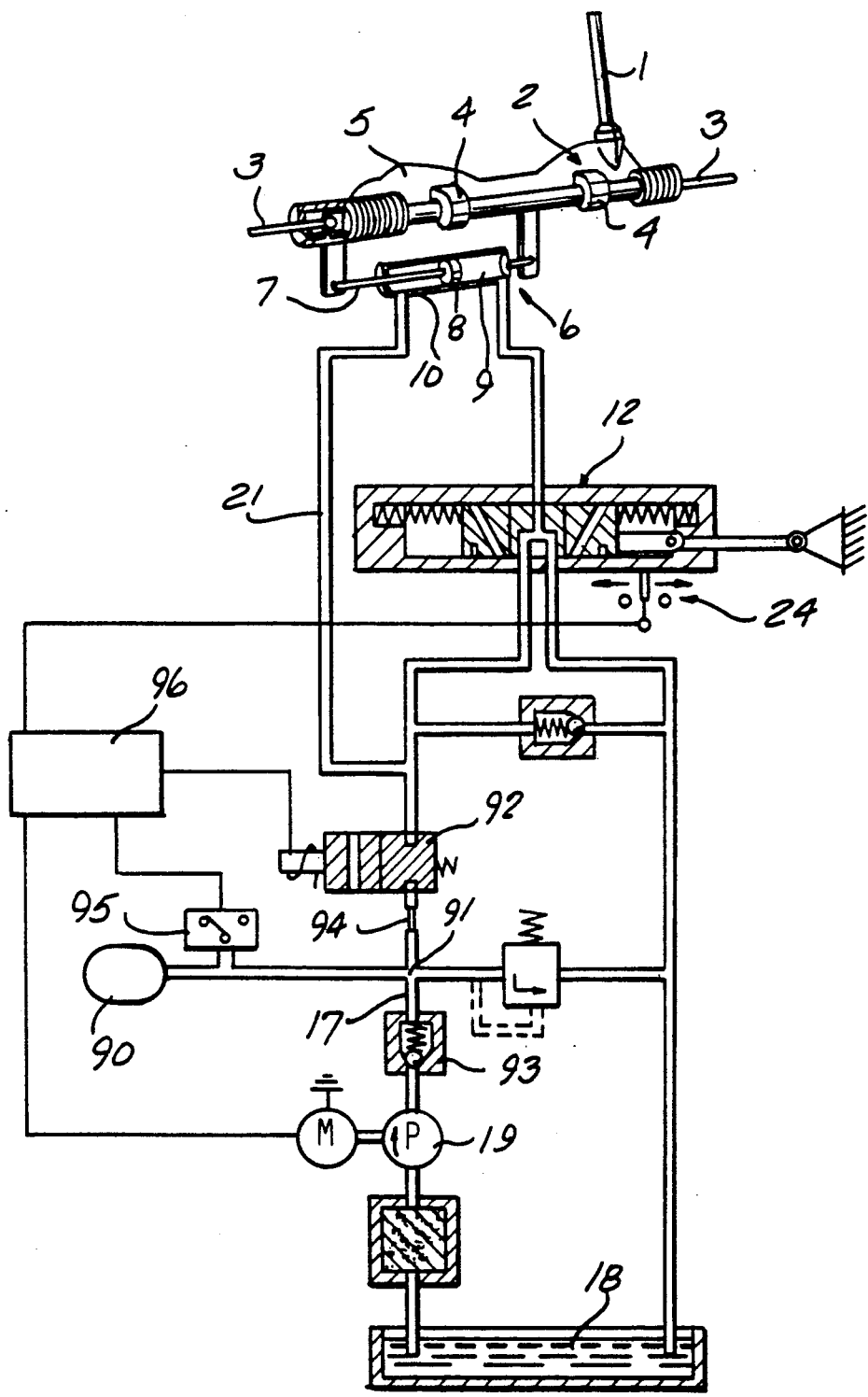
FIG. 10 shows an embodiment of the invention with accumulator and centrally open control valve.
Figure 11:
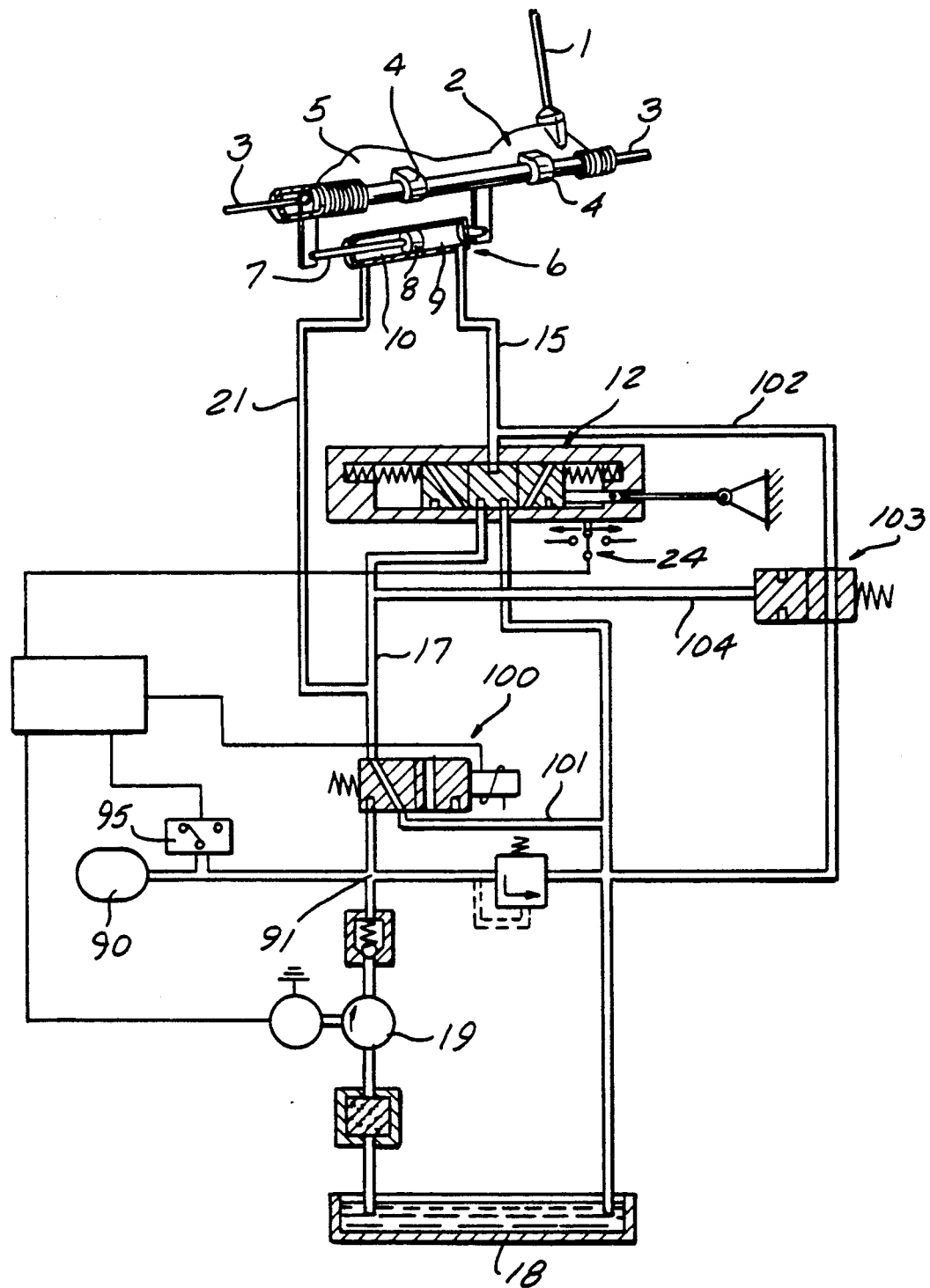
FIG. 11 shows an embodiment of the invention with centrally closed control valve.

FIGS. 10 and 11 show embodiments of the invention in which an accumulator is connected to the hydraulic unit in order to cover the hydraulic fluid demand. This will, in particular, be desirable when the power consumption of the pump or, rather, of the electric motor is limited for reasons of energy or cost. As regards its arrangement and its functioning, the embodiment according to FIG. 10 corresponds in essence to the embodiment illustrated in FIG. 1, however, an accumulator 90 is connected to the intersection 91, that is to the link 17 between the pump and the control valve 12, respectively to the link 21 which connects the pump to the power chamber 10. A switching valve 92, closed when de-energized, is inserted between the intersection 91 and the point of connection of the hydraulic fluid line 21 to the link 17. Between the pump 19 an the intersection 91 at which the pressure relief valve 23 also is connected, a non-return valve 93 is provided which blocks the direction of flow from the intersection 91 to the pump 19. A restrictor 94 is arranged between the intersection 91 and the switching valve 92. A pressure switch 95 being subject to the pressure of the accumulator 90 switches on the pump 19 through the electric control unit 96 in the event of a pressure drop. In the closed switching position, the switching valve 92 renders possible a pressure build-up in the accumulator 90 because otherwise, due to the design of the control valve 12 as a centrally open control valve, the accumulator 90 would constantly be connected to the tank 18. When the electric switch 24 is actuated due to the initiation of a steering motion by the driver, both the pump 19 and the switching valve 92 will be switched, so that a link is established between the intersection 91 and the power chamber 10, respectively the control valve 12.

An embodiment of the invention which is particularly economical because of very low losses due to leakages, provides for a centrally closed control valve 12, as is illustrated in FIG. 11. This embodiment corresponds in essence to that shown in FIG. 10. However, in lieu of the switching valve 92, a 3/2-way valve 100 is employed which in the de-energized condition interrupts the connection between the intersection 91 and the control valve 12, respectively the power chamber 10, but connects the hydraulic fluid line 21 through the link 101 to the tank 18. A line 102 which also leads to the tank 18 is connected to the link 15 between the control valve 12 and the power chamber 9. In that line 102, a hydraulically switchable check valve 103 is inserted which is open in the non-actuated condition. Check valve 103 is switched by a control line 104 which is connected to the link 17.

As in the embodiment according to FIG. 10, the pump 19 is switched on by means of the pressure switch 95 in the event of a pressure drop in the accumulator 90. When the steering assembly is operated, the electric switch 24 will switch both the pump and the 3/2-way valve 100. In this switching position, the passage from the link 17 to the link 101 is closed, the connection from the intersection 91 to the control valve 12, respectively to the power chamber 10 is open. The check valve 103 will be closed due to the pressure building up in the link 17. Of course, when the steering assembly is operated as described above, also the control slide valve 13 will be actuated, which controls the pressurization of the power chambers 10 and 9. In the event of a steering operation with very low steering power, during which the electric switch 24 is not actuated, a pressureless shifting of the hydraulic fluid from one power chamber into the other will be possible owing to the power chambers 9, 10, being connected through the check valve 103, respectively through the 3/2-way valve 100 to the tank 18.

When the maximum steering turn of the wheels is reached during a steering operation, that is, when one stop of the rack comes to be abutted against the housing of the steering gear, a so-called short circuit of force will occur. This means that no reaction power will any longer be effective in the elastic suspension of the steering gear 2 to the body 5. As a result, the control valve 12 will be brought into its central position, and the hydraulic power assistance will be switched off. If a wheel should come in abutment with an "external stop" (for example, at a curb) then the power exerted on the spring element 50 will sharply rise. In an embodiment according to FIG. 5, the elastic block 70 will strongly be compressed, for example, in the event of a steering direction by which the reaction rod 26 is moved away from the control slide valve 13. In this situation, the control slide valve 13 will follow up constantly by means of helical springs 56. This will be the case until the front side of the control slide valve 13 facing the chamber 63 releases a connection of the control bore 59 to the chamber 63 and, thus, to the tank. By this provision which is adjustable by an exactly defined and dimensioned geometry of the control slide valve 13, a pressure limitation of the system is realized. The same provision is made for a slide in the opposite direction, but which is not illustrated in FIG. 5.

Figure 13:
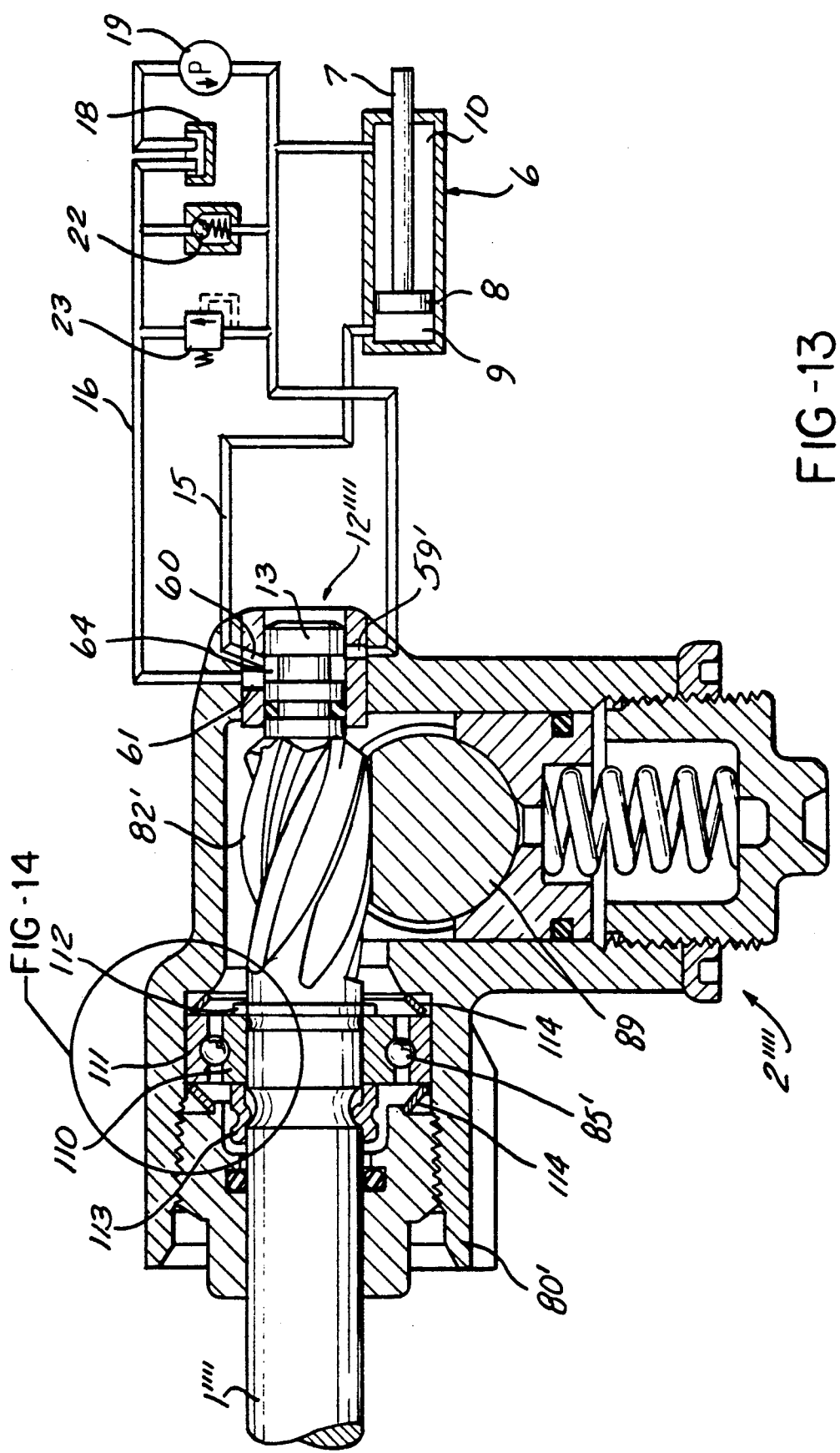
FIG. 13 shows another embodiment.

The embodiment shown in FIG. 13 comprises a steering gear 2 in which a portion of the steering axle 1 includes a driving pinion 82 which is axially slidably supported and is in engagement with the rack 89. This rack 89 is coupled to the steering tie rods of the front wheels of an automotive vehicle (not shown). At the end of the driving pinion 82 opposite to the steering axle 1, the control slide 13 of the control valve 12 is shaped coaxially at the driving shaft. The control slide 13 contains an annular groove 64 and is supported in a control bushing, inserted into the housing 80 of the steering gear, in a sealed manner in relation to the driving pinion 82. The control bushing comprises radial bores which, towards the outside, connect to the control bores 59, 60 and 61, respectively, with the connection between these control bores being determined by the position of the control slide 13. Alongside of the axial extension of the control bushing, the control bore 60 is arranged between the other two control bores 59 and 61.

The control bore 59 communicates by way of the link 17 with the pressure side of a pump 19, to which link the power chamber 10 of the power cylinder 6 also is connected. This power cylinder 6 is arranged as a differential cylinder with a piston 8 and a piston rod 7 extending on one side out of the cylinder. The piston rod 7 has a cross-section which is half the size of the cross-section of the piston 8. Hence, the pressurizing surface of the power chamber 9 which is opposed to the power chamber side 10 close to the piston rod is twice as large as the pressurizing surface of the power chamber 10. The power chamber 9 communicates with the control bore 60 through the link 15. Link 16 connects the unpressurized tank 18 to the control bore 61. Interposed between the link 17 and the link 16 is a pressure relief valve 23 which, in the event of an imminent system excess pressure, discharges pressure fluid into the tank. In parallel to the pressure relief valve, there is provided an intake valve 22 which, in its design as a spring-loaded non-return valve, closes the flow connection between link 17 and link 16. This intake valve 22 serves to additionally suck in pressure fluid into the power chamber 10 when steering of the vehicle is performed without hydraulic power assistance. In a like steering operation, the power cylinder 6 coupled to the steering tie rods is displaced mechanically, that is by the driver's physical effort which means that the piston rod 7 is moved into the power cylinder 6 in this case.

Figure 14:
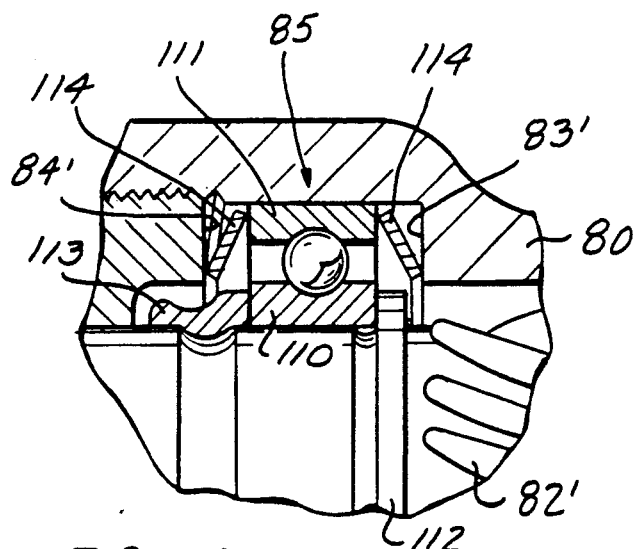
FIGS. 14 to 16 show each an enlarged representation of a detail of FIG. 13.

The support of the driving pinion in the housing 80 of the steering gear is effected by way of the ball bearing 85 and the control slide 13 acting as a journal bearing. This support is configured axially slidably in that the internal ring of the ball bearing 85 is fixed between a collar 112 and a fastening sleeve 113 in axial direction on the driving pinion 82, while the external ring 111 is supported in the housing 80 so as to be axially slidable within limits. On the frontal ends, the external ring 111 is acted upon by cup springs 114 which respectively bear against the associated stops 83, 84 on the housing. This axially movable support is illustrated in FIG. 14 on an enlarged scale.

Figure 15:
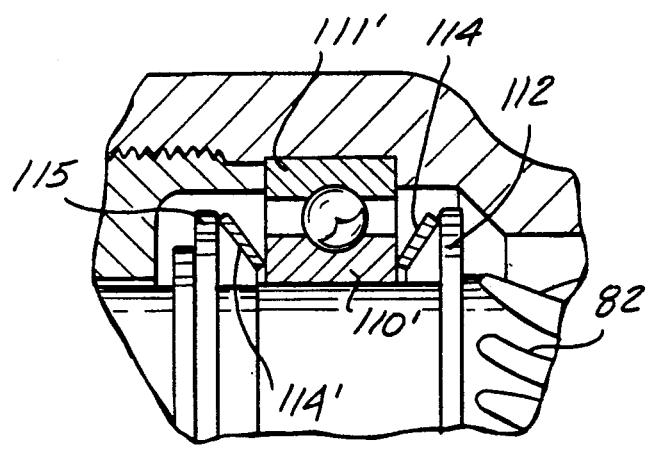

FIG. 15 illustrates on an enlarged scale another variant of the axially movable support, wherein the external ring 111 is fixed on the housing, whereas the internal ring 110 is supported biassed by the cup springs 114, which bear against the collar 112 and 115, respectively, and axially slidably on the driving pinion 82.

The axially slidable and prestressed support of the driving pinion in conjunction with the helical gearing serves to operate and/or activate the control valve 12 and the pump 19 such as by electric connections as well as an electric switch operated by the driving pinion are provided) only when the driver has applied a specific steering torque to the steering axle 1. The axial force component acting on the steering axle 1 results from the helical gearing of the driving pinion 82. If the steering torque applied by the driver is less than the value predefined by the cup springs 114, the steering system will be operated without hydraulic power assistance. Unpressurized, the pressure fluid is shifted to and fro between the two power chambers 9 and 10.

In the presence of a higher amount of steering torque, the driving pinion 82 is moved into or out of the housing 80 depending on the direction of rotation, as a result the switch for activating the pump 19 is operated, on the one hand, and the control valve 12 is moved, on the other hand, which governs the pressurization and hence the direction of force of the power cylinder 6 generating the auxiliary power.

The position illustrated in FIG. 13 corresponds to a centered condition of the steering system that is not actuated or is actuated with a very low hand power. The pressure outlet of the pump 19 as well as the two power chambers 9, 10 are connected with the tank 18. Pump 19 is switched off. When the driving pinion 82 is displaced into the housing, the control slide 13 coupled to the driving pinion isolates the control bore 61 connecting to the tank 18 from the control bores 59 and 60. The pump is activated, and both power chambers 9 and 10 are pressurized.

The piston rod 7 is moved out of the power cylinder 6 due to the difference of the pressurizing surfaces on the power piston 8. When the steering wheel is turned in the other direction, then control slide 13 shifts into a position in which the control bore 59 is isolated from the other two control bores 60, 61, whereby the power chamber 9 is connected to the tank 18. Pump 19 is switched on. In this event, solely the power chamber 10 is acted upon by the pump pressure, with the piston rod 7 moving into the power cylinder 6 as a result. Due to the above-mentioned geometrical dimensioning of the pressurizing surfaces on the power piston 8, the assisting power in both steering directions is of equal magnitude.

Figure 16:
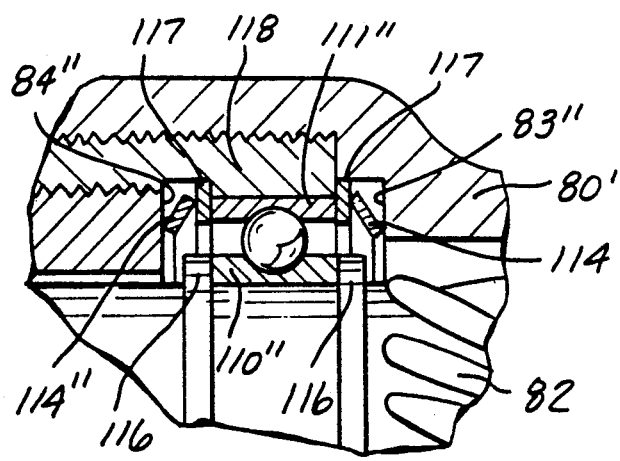

In the bearing variants and/or prestressing variants according to FIGS. 13 to 15, the effective preloading force acting upon the driving pinion 82 reaches the value zero in the position of rest, since the force components of the two cup springs 114 are compensated. Therefore, to develop a preloading force, first a certain distance must be covered by the driving pinion 82, while the backward spring assists in this movement If, however, a pre-loading force is desired to become effective instantaneously from the position of rest, this can be realized by mounting a captivated spring element, as is illustrated in FIG. 16. In this embodiment, the internal ring 110 of the ball bearing 85 is fixed on the driving pinion 82 by two fastening rings 116, and the external ring 111 is supported on an inwardly projecting step 118 formed fast with the housing, which step has an axial extension that corresponds to the bearing width. Two washers 117 respectively abut both on the end surface of the external ring 111 and on the end surfaces of the step 118 and are biassed by cup springs 114, the latter springs taking support on the stops 83, 84 formed fast with the housing. When the driving pinion 82 is displaced axially out of the zero position in this embodiment, only one of the two cup springs 14 will act upon the commencement of displacement, while in the embodiments according to FIGS. 13 to 15 displacement takes place in opposition to the force of a spring, with the oppositely lying cup spring assisting in the direction of movement. According to FIG. 16, this assisting force emanating from the cup spring arranged opposite to the direction of movement is not present, since the spring bears against the step 118.

Figure 17:
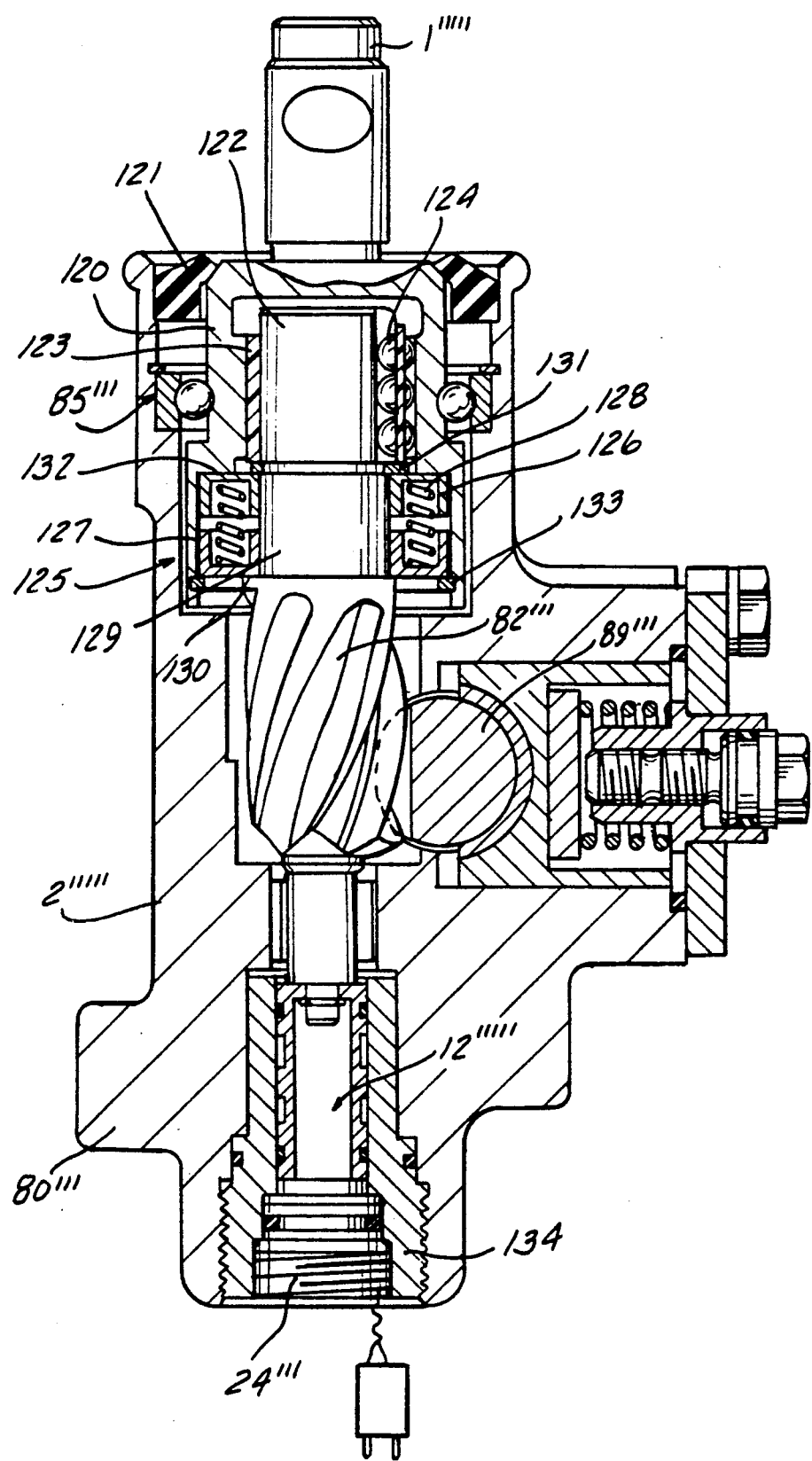
FIGS. 17 to 18 show still further embodiments of this invention.

FIG. 17 illustrates a steering gear 2 with integrated control valve 12 whose structure corresponds basically to the steering gear according to FIG. 13. In this arrangement a helically geared driving pinion 82 also is axially slidably supported and connected with the control valve 12, the driving pinion 82 being in engagement with the rack 89. However, the axially slidable and preloaded support of the driving pinion 82 does not take place exclusively in the housing 80, but in a portion 120 of the steering axle 1. This design bears the advantage that the steering axle 1 is not exposed to any axial movement, which therefore allows use of the same steering axle construction for fitting into the automotive vehicle as that provided in a steering system design without hydraulic power assistance. More particularly, the need for mounting a device compensating for axial movements into the steering axle 1 is obviated. This steering axle 1 comprises a cup-shaped portion 120 projecting into the housing 80 and is axially fixedly supported in the housing 80 by virtue of a ball bearing 85. The external contour of this portion 120 is furnished with a rounded circumferential groove in which the roll bodies of the ball bearing 85 roll off, an additional internal bearing ring being eliminated as a result.

The cup-shaped portion 120 is of a stepped configuration and includes on its internal contour a bearing seat 121. In this bearing seat 121, the journal pin 122 of the driving pinion 82 is supported axially slidably on balls 124. These balls 124 simultaneously serve as carrier links for transmitting the rotational movement of the steering axle 1 onto the driving pinion 82.

Both the journal pin 122 and the bearing seat 121 are each provided with three axial grooves of like width which are evenly spread over the periphery and into which three balls 124 respectively are inserted in such a fashion that they are in engagement with the journal pin 122 of the driving pinion 82 and the portion 120 of the steering axle 1. In order to always ensure the rolling ability of the individual balls 124, they are arranged in a guiding cage 123. Because of this axial roller bearing, friction influences such as, for example, the so-termed stick-slip effect as well as influences on the response behavio[u]r of the hydraulic power assistance due to wear, material combinations, lubricating condition etc. are precluded.

The axial preload on the driving pinion 82 is achieved by the centering spring assembly 125 which is arranged as a captivated spring element. To this end, two prop rings 126, 127 are provided both of which have a U-shaped cross-section, with the open sides of these profiles facing each other. In the prop rings 126, 127, over the periphery thereof, several centering springs 128 are provided which keep the two prop rings biassed at a defined distance from each other. Under axial preload and at an axial distance, the prop rings 126, 127 are supported with their inner periphery on the step 129 are supported with their inner periphery on the step 129 of the driving pinion 82 between the step 130 and a fastening ring 131. The outside periphery of the prop rings 126, 127 is supported in the portion 120 of the steering axle 1 between an annularly circumferential stop 132 and another fastening ring 133. The axial distances between the step 130 and the fastening ring 131 and between the stop 132 and the fastening ring 133 correspond to each other.

On the end of the driving pinion 82 opposite to the journal pin 122, the control slide of the control valve 12 is arranged which extends into the valve sleeve 134 which, in turn, is furnished with control bores (not shown). The control slide of the control valve 12 serves to operate the electric switch 24 which switches the pump on and off. The function of the described arrangement corresponds to the design according to FIG. 13, while the hydraulic part of the auxiliary power steering system has not been shown for clarity.

Figure 18:
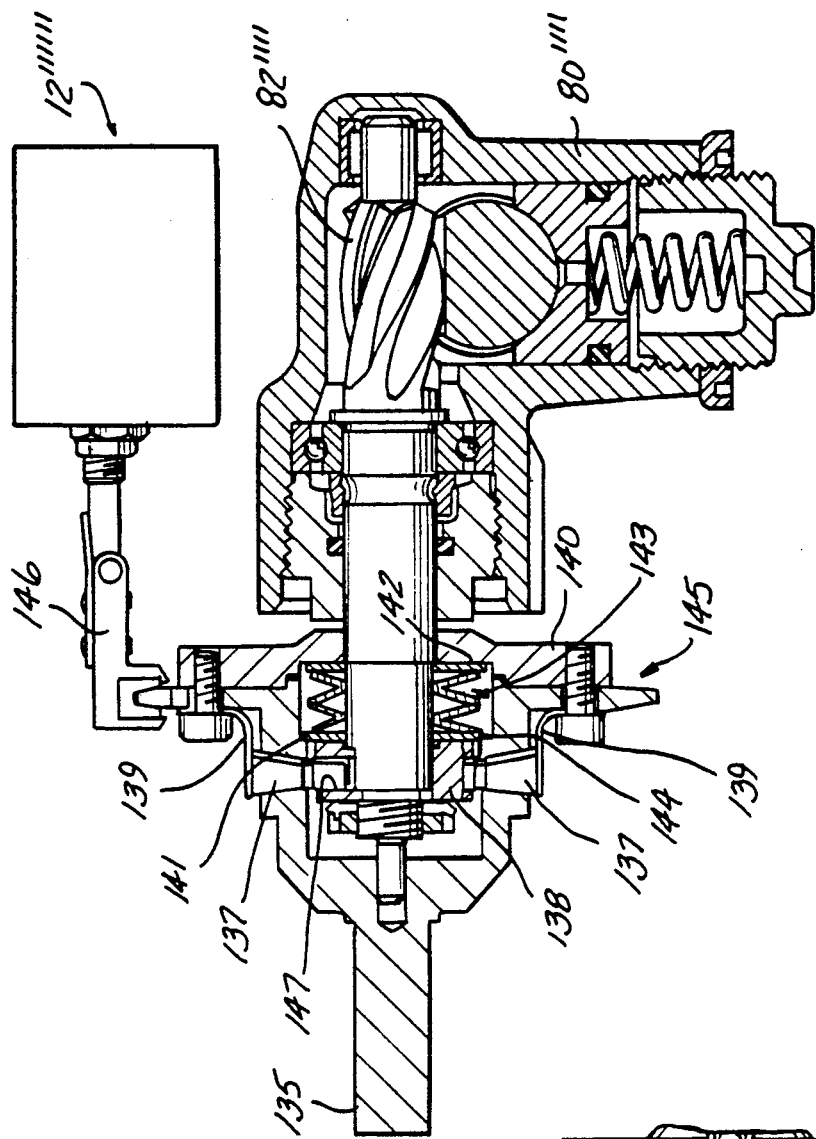
Figure 19:
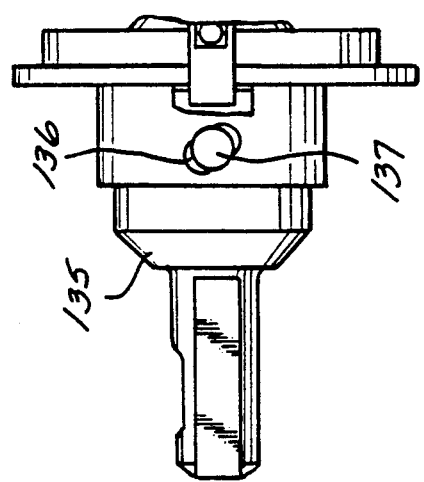
FIG. 19 shows a lateral partial view of the embodiment according to FIG. 18.

Whereas helically geared driving pinions have been the basic device for the mode of functioning in the previously described embodiments of the present invention, a straight-toothed driving pinion is provided in the embodiment according to FIG. 18. This straight-toothed driving pinion 82 is supported axially fixedly in the housing 80 in a known manner. A bell-shaped steering-axle portion 135 is axially slidably supported on the part of the driving pinion 82 that is of stepped design and projects from the housing 80. The steering-axle portion 135 comprises two coulisse-type guides 136 which extend transversely to the periphery and/or the radial plane as best illustrated in FIG. 19. Transmission pins 137 are inserted into the coulisse-type guides 136, whose radially inwardly directing end portions engage into bores 147 of the hub 138 which is coupled to the driving pinion 82 in an anti-torsion and axially fixed manner. The oblong-hole-type coulisse guide 136 includes boundaries which taper from the outside periphery of the steering-axle portion 135 towards the internal contour of this portion. In this area, the transmission pin 137 is of conical design, while the pin portion which is rigidly arranged in the hub 138 is of cylindrical configuration. The transmission pins 137 are biassed in the direction of their longitudinal axis by leaf springs 139 in the direction of the hub 138.

On its side facing the housing 80, the bell-shaped steering-axle portion 135 is closed by the annular plate 140 which, with its inner periphery, is supported on the driving pinion 82. In an axial direction, the steering-axle portion 135 is biassed in a captivated manner in relation to the driving pinion 82. A cup-spring assembly 143 is arranged pre-loaded between the washers 141 and 142 to bias the steering-axle portion 13 in the captivated manner in relation to the driving pinion 82. The washer 14 bears against both the hub 138 and the step 144 of the steering-axle portion 135. The washer 142 abuts on the annular plate 140 and on a step of the driving pinion 82.

The steering-axle portion 135 comprises a circumferential, radially outwardly directed collar 145 which is embraced by a fork-like actuating element 146 of the control valve 12. This control valve 12 also includes an electric switch and is connected both electrically and hydraulically to the pump, the tank, the power cylinder, etc. in the manner previously described with respect to FIG. 13.

When the steering axle and hence the steering-axle portion 135 is applied with a steering torque by the drive to move from its centered position, this torque is supplied to the driving pinion 82 by the transmission pins 137. Because of the transverse coulisse-type guides 136, a steering-torque-responsive axial force component becomes effective on the steering-axle portion 135 which tends to displace the steering-axle portion 135 relative to the driving pinion 82 in opposition to the preloading force of the cup spring assembly 143. As soon as this axial force exceeds the preloading force of the cup spring assembly 143, the steering-axle portion is moved towards or away from the housing 80 depending on the direction of rotation and, due to this movement, applies the actuating element 146 of the control valve 12 by way of the collar 145. As a result, as has been described hereinabove, the pump 19 is activated, and the pressurization of the individual power chambers of the power cylinder 6 is controlled.

Advantageously the embodiment last described can be added in a simple way to an existing purely mechanical steering assembly, without the need to make modifications to the steering gear or any other part of the mechanical steering assembly.

What is claimed is:

1. A hydraulically assisted steering system for an automotive vehicle having a pair of steering members comprising: a mechanical steering gear coupled to said steering members, elastic mounting means allowing shifting of at least a portion of said steering gear by a steering force reaction created by a predetermined steering force applied to said steering members by said steering gear;

a source of pressurized hydraulic fluid;

hydraulic actuator means for controllably applying a steering assist force to at least one of said steering members in either direction to assist steering by said steering gear;

control valve means responsive to shifting of at least a portion of said steering gear in either direction caused by said steering reaction force to pressurize said hyraulic actuator means to exert said steering assist force in a respective direction.

2. The system according to claim 1 wherein said hydraulic actuator means comprises a double acting power assist cylinder having a piston movable in either direction coupled to one of said steering members to exert a steering force thereto in either direction upon pressurization thereof on either side of said piston by said source of pressurized hydraulic fluid;

wherein said control valve means has two elements slidable with respect to each other from a neutral position to displaced positions in either direction from said neutral position;

one of said control valve elements connected to shift with said steering gear and means causing the other of said control valve elements to not shift with said steering gear;

said control valve means connected to said source of pressurized hydraulic fluid and including means causing fluid pressure to be applied to said power cylinder to cause a steering assisting force to be generated in one direction upon relative shifting of said control valve elements from said neutral position in one direction or to be generated in the other direction upon relative sliding of said control valve elements from the neutral position in the other direction.

3. The system according to claim 2 further including spring means tending to resist sliding of said control valve elements from said neutral position as said steering gear shifts with the development of said predetermined steering reaction force.

4. The system according to claim 3, wherein said means causing said other control valve element to not shift with said steering gear includes a rod connected at one end to said vehicle engaging said other control valve element at the other end and means causing said other control valve element to follow said rod other end as said steering gear shifts in either direction.

5. The system according to claim 4 wherein said spring means includes a compressible element and means mounting said compressible element on said rod and said steering gear so as to be compressed as said steering gear shifts in either direction to thereby cause said rod to exert a resistance to shifting of said steering gear and to sliding of said control valve elements from said neutral position in either direction.

6. The system according to claim 3 further including means for adjustably prestressing said spring means to vary the magnitude of resistance to sliding of said control valve elements from said neutral position.

7. The system according to claim 5 further including means for adjustably precompressing said compressible element to vary the resistance exerted by said rod.

8. The system according to claim 2 wherein a source of pressurized hydraulic fluid comprises a pump and electric motor for driving said pump and further includes switch means activated by shifting of at least a portion of said steering gear to cause said control valve elements to slide from said neutral position in either direction to energize said pump drive motor.

9. The system according to claim 4 wherein said rod is pivotally mounted at said one end.

10. The system according to claim 2 wherein said pump, electric pump drive motor, control valve means, and said hydraulic actuator are all mounted as a unit to said steering gear.

11. The system according to claim 2 wherein said control valve means elements comprises a valve slide and a valve housing slidably receiving said valve slide.

12. The system according to claim 8 wherein said power cylinder piston is of a differential effective area with one side having a greater area than the other, and wherein said pump means when said drive motor is energized continuously supplies pressurized hydraulic fluid to said lesser area side of said piston and said control valve means meters flow to said greater area side to cause a steering assist force to be generated in either direction depending on the direction of sliding of said control valve elements from said neutral position.

13. The system according to claim 4 wherein said rod is attached to said other valve element to fix said valve element against movement in either direction.

14. The system according to claim 8 wherein said electric pump drive motor is reversible and wherein either side of said power cylinder piston is of equal effective area and wherein said control valve means meters fluid under pressure therefrom to either side of said piston in response to shifting of said control valve elements in respective directions from said neutral position.

15. The system according to claim 1 wherein said steering gear is elastically mounted as a unit by said elastic mounting means to allow said steering gear to shift transversely of said vehicle axis in reaction to said steering assist force applied to said steering members.

16. The system according to claim 3 wherein said control valve means includes means allowing discharge of pressurized hydraulic fluid from said cylinder and aspiration of unpressurized hydraulic fluid upon stroking of steering members by said steering gear generating a reaction force below the level necessary to overcome the resistance of said spring means.

17. A hydraulically assisted steering system as claimed in claim 2, wherein said steering gear includes a helical driving pinion gear.

18. A hydraulically assisted steering system as claimed in claim 17, wherein said steering gear includes a housing and further includes means mounting said helical driving pinion to be axially slidably supported within said housing said driving pinion comprising said portion of said steering gear shifted in reaction to said predetermined steering force, and wherein spring means resists axial sliding of said helical driving pinion and wherein the sliding of said helical driving pinion actuates said control valve means.

19. A hydraulically assisted steering system as claimed in claim 5, wherein said compressible element is an elastomeric body.

20. A hydraulically assisted steering system as claimed in claim 8, wherein said switch means is integrated in said spring means.

21. A hydraulically assisted steering system as claimed in claim 3, wherein said control valve means other element is elastically centered in siad one element by said spring means.

22. A hydraulically assisted steering system as claimed in claim 1, wherein an accumulator is interposed between said pump and said control valve means.

23. A hydraulically assisted steering system as claimed in claim 2, wherein a switching pilot valve is provided between said accumulator and said control valve means.

24. A hydraulically assisted steering system as claimed in claim 23, wherein a restricting point is provided between said accumulator and said control valve means.

25. A hydraulically assisted steering system as claimed in claim 1 wherein said vehicle includes a hydraulic brake system, and where in said hydraulic actuator means is integrated into said hydraulic brake system.

26. A hydraulically assisted steering system as claimed in claim 25, wherein said hydraulic brake system includes a supply of hydraulic fluid, and where in said hydraulic brake system supply also supplies said hydraulic with hydraulic fluid.

27. A hydraulically assisted steering system as claimed in claim 2 wherein said steering gear includes a rack-and-pinion gearing with a driving pinion, a steering axle, and coupling means coupling said driving pinion to said steering axle, and a rack driven by said driving pinion, wherein said means coupling said steering axle to said driving pinion includes at least one pin driven with said driving pinion, a rotary element connected to said driving axle having at least one radially extending recess engaged by said at least one pin and wherein said at least one recess comprises a coulisse type guide extending transversely relative to the radial plane, and wherein said steering axle is supported on the driving pinion in an axially slidable and biased manner by said coupling means, and lever means where by said control valve means is operated by movement of said rotary element.

28. A hydraulically assisted steering system as claimed in claim 2, wherein said steering gear includes a helical driving pinion and a steering gear housing mounting means mounting said driving pinion to be axially slidably supported in said housing said mounting means including at least one roller bearing having an external ring acted upon either frontal ends by elastic means, and wherein said roller bearing has an internal bearing ring axially fixed to said driving pinion, said driving pinion coupled to said one element of said control valve means to be shifted together therewith upon development of siad predetermined steering reaction force.

* * * * *